(12) United States Patent
Shimshi

(10) Patent No.: US 7,080,509 B2
(45) Date of Patent: Jul. 25, 2006

(54) SYSTEM FOR OBTAINING ROTATIONAL ENERGY FROM AMBIENT FORCES

(76) Inventor: Ezra Shimshi, P.O. Box 421011, Atlanta, GA (US) 30342

( * ) Notice: Subject to any disclaimer, the term of this patent is extended or adjusted under 35 U.S.C. 154(b) by 0 days.

(21) Appl. No.: 11/023,154

(22) Filed: Dec. 27, 2004

(65) Prior Publication Data
US 2006/0137338 A1   Jun. 29, 2006

(51) Int. Cl.
*F03G 3/00* (2006.01)
(52) U.S. Cl. ............ 60/517; 60/519; 60/520; 290/1 R; 290/1 A
(58) Field of Classification Search ............ 60/517, 60/518, 519, 520, 525; 290/1 R, 1 A
See application file for complete search history.

(56) References Cited

U.S. PATENT DOCUMENTS

| 2,513,692 | A | * | 7/1950 | Tubbs | 60/496 |
|---|---|---|---|---|---|
| 3,360,926 | A | * | 1/1968 | Parr | 60/496 |
| 3,941,030 | A | * | 3/1976 | Massung | 60/675 |
| 3,984,985 | A | * | 10/1976 | Lapeyre | 60/675 |
| 4,121,420 | A | * | 10/1978 | Schur | 60/675 |
| 4,311,015 | A | * | 1/1982 | Rust | 60/675 |
| 6,644,026 | B1 | * | 11/2003 | Shimshi | 60/675 |
| 6,798,081 | B1 | * | 9/2004 | Brehob | 290/43 |
| 6,914,339 | B1 | * | 7/2005 | Rios-Vega | 290/1 R |

FOREIGN PATENT DOCUMENTS

| CH | 654877 | A5 | * | 3/1986 |
|---|---|---|---|---|
| GB | 2128258 | A | * | 4/1984 |
| WO | WO 9727401 | A1 | * | 7/1997 |

* cited by examiner

*Primary Examiner*—Sheldon J Richter

(57) ABSTRACT

The intended purpose of my invention is to create a point of origin in system from which driving thrusts could evolve. In this system, vacuum can be developed with less force than it naturally is required to create said vacuum. By posting a cylinder, containing two pistons in each cylinder, on each side of the axis of rotation and having gas flow in an out the cylinders under controlled pressures, the system could create such vacuum. As a result, said vacuum can lift more mass than the mass creating said vacuum and, thus, imbalance could be achieved that rolls the system in one direction.

4 Claims, 6 Drawing Sheets

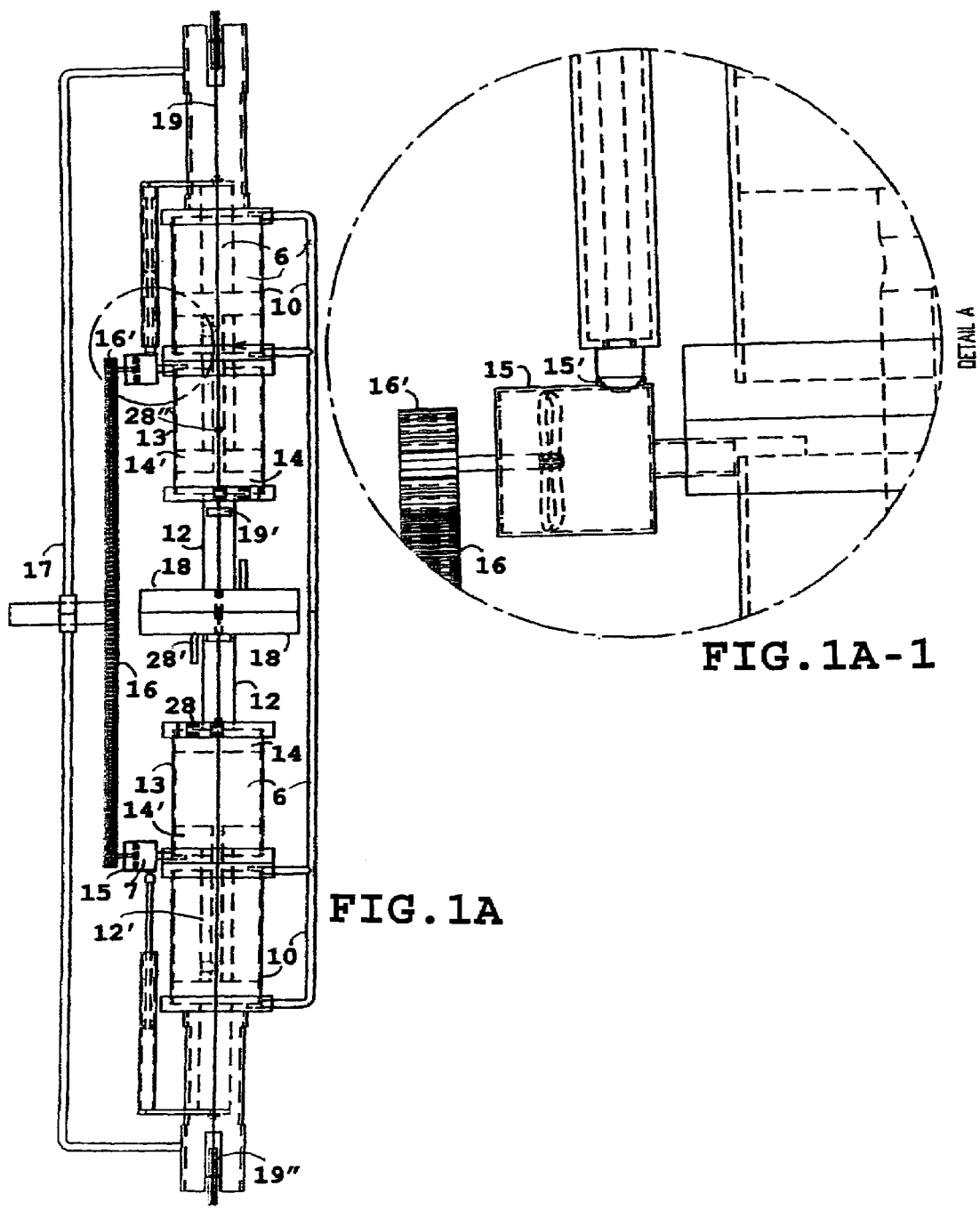

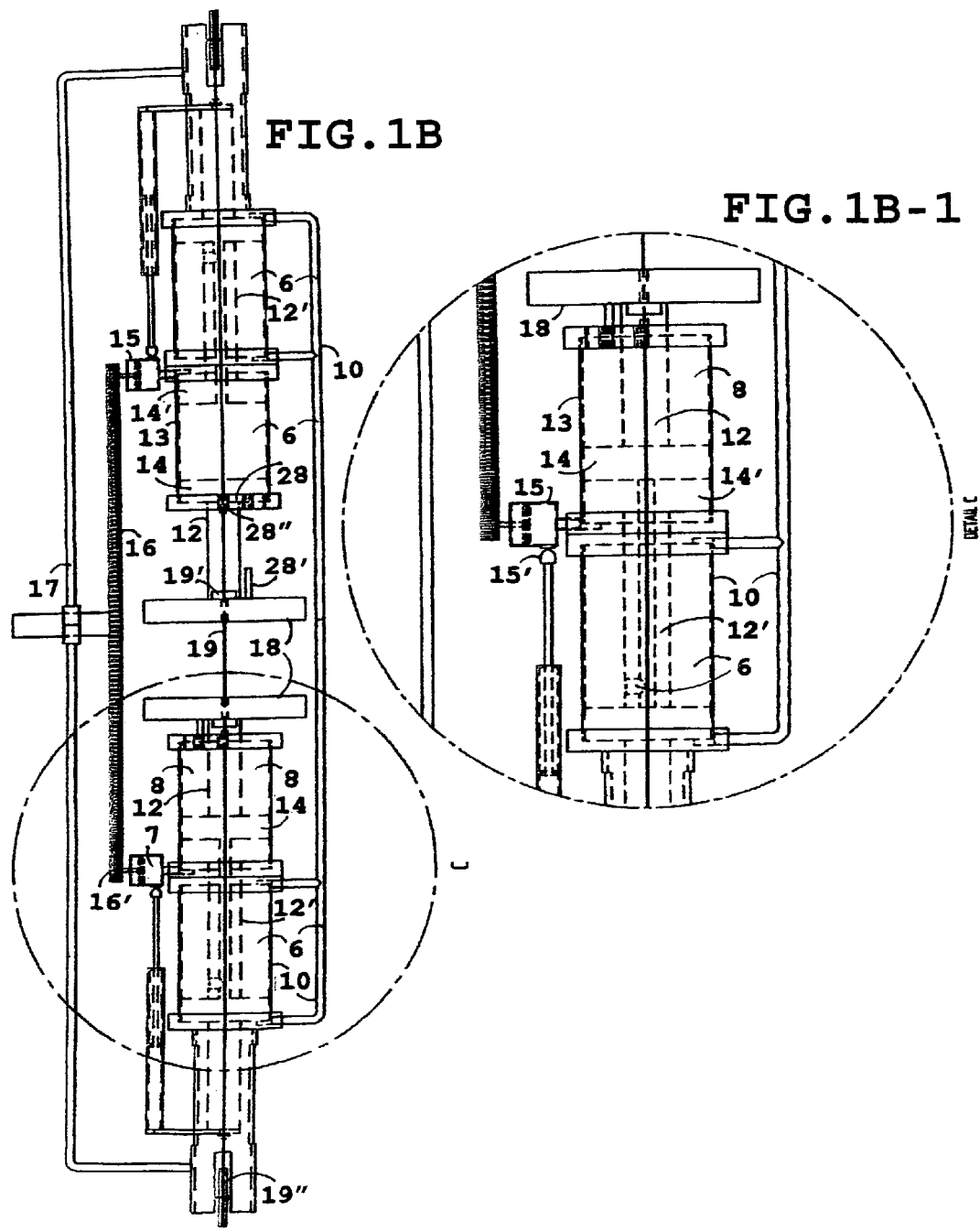

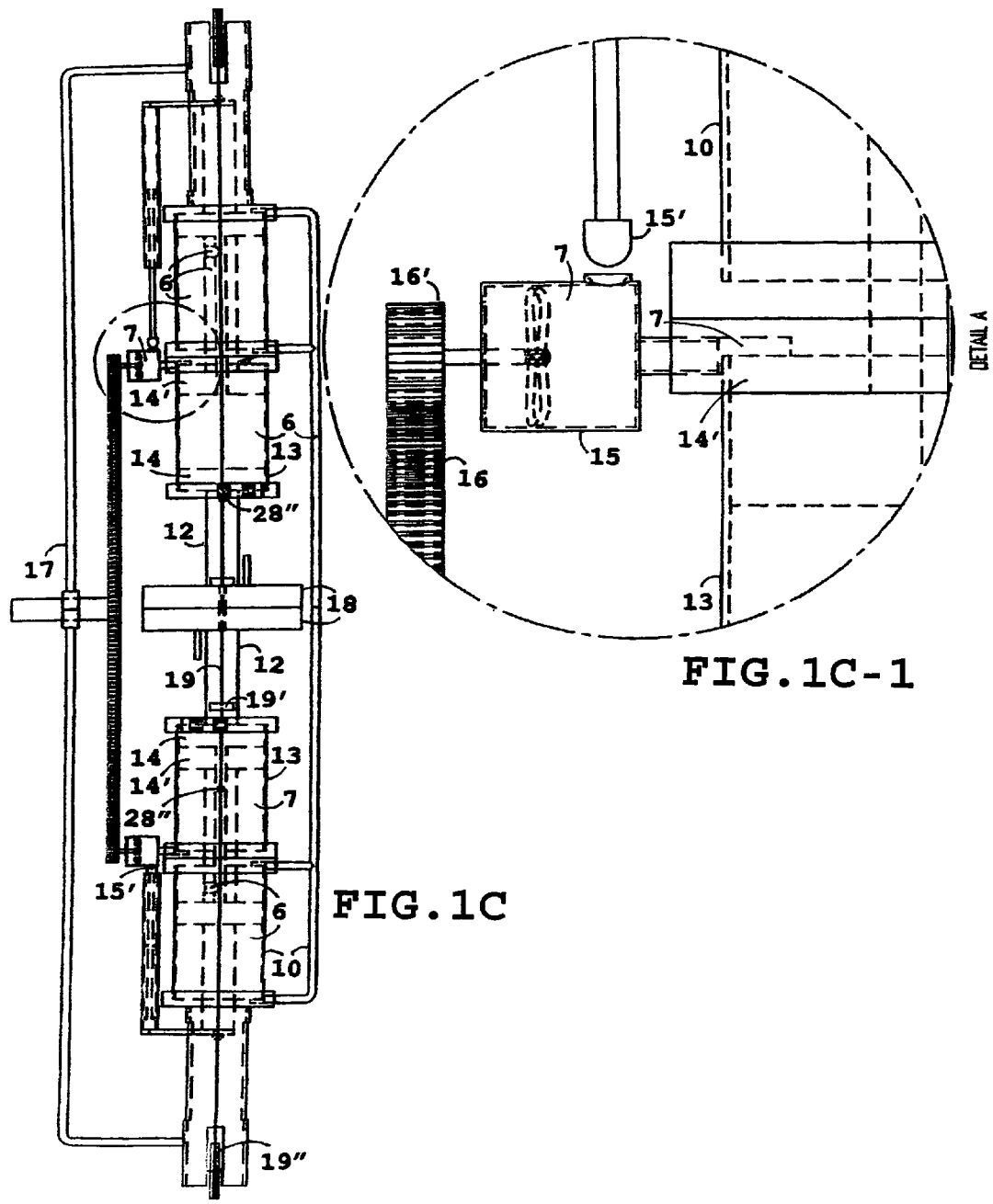

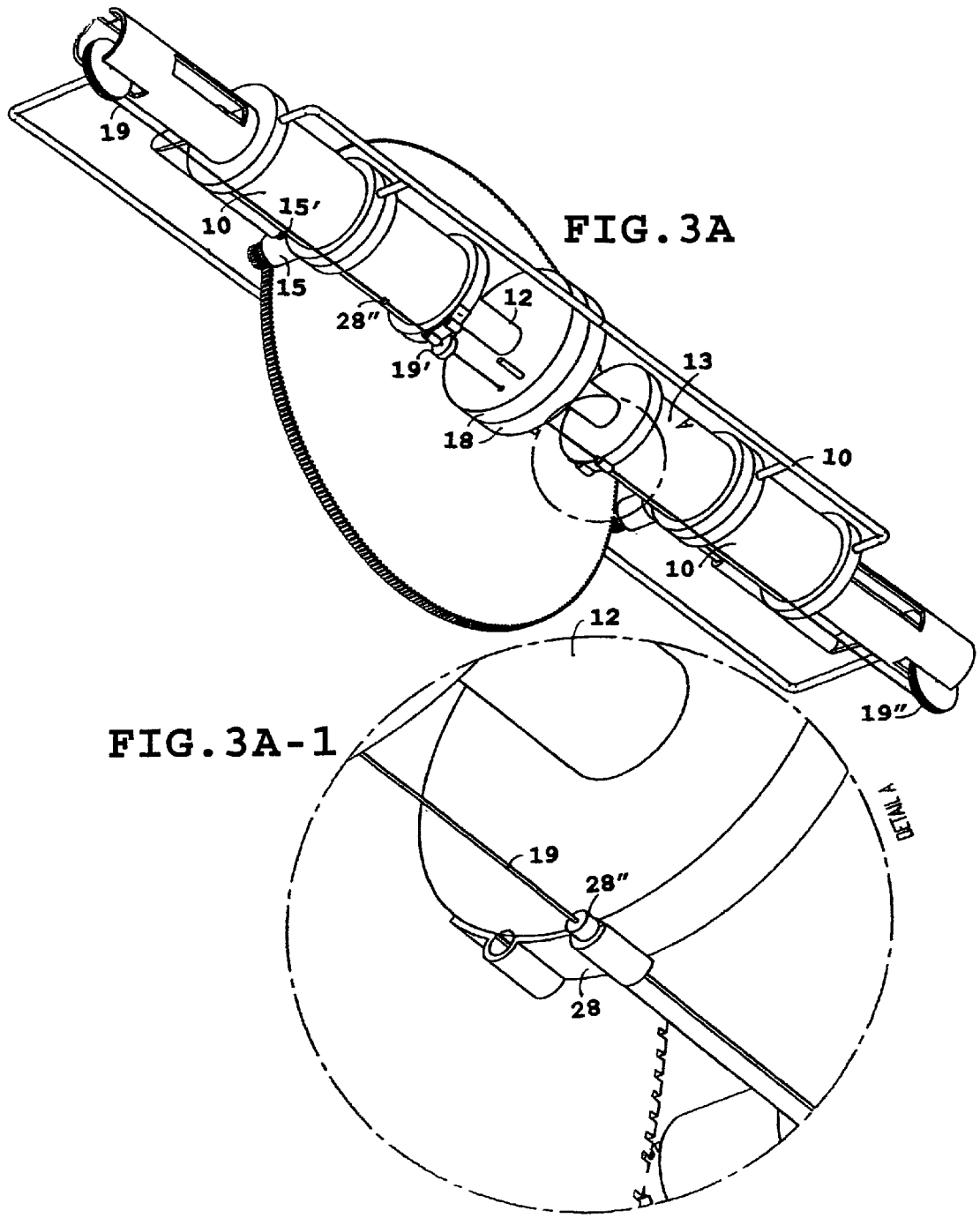

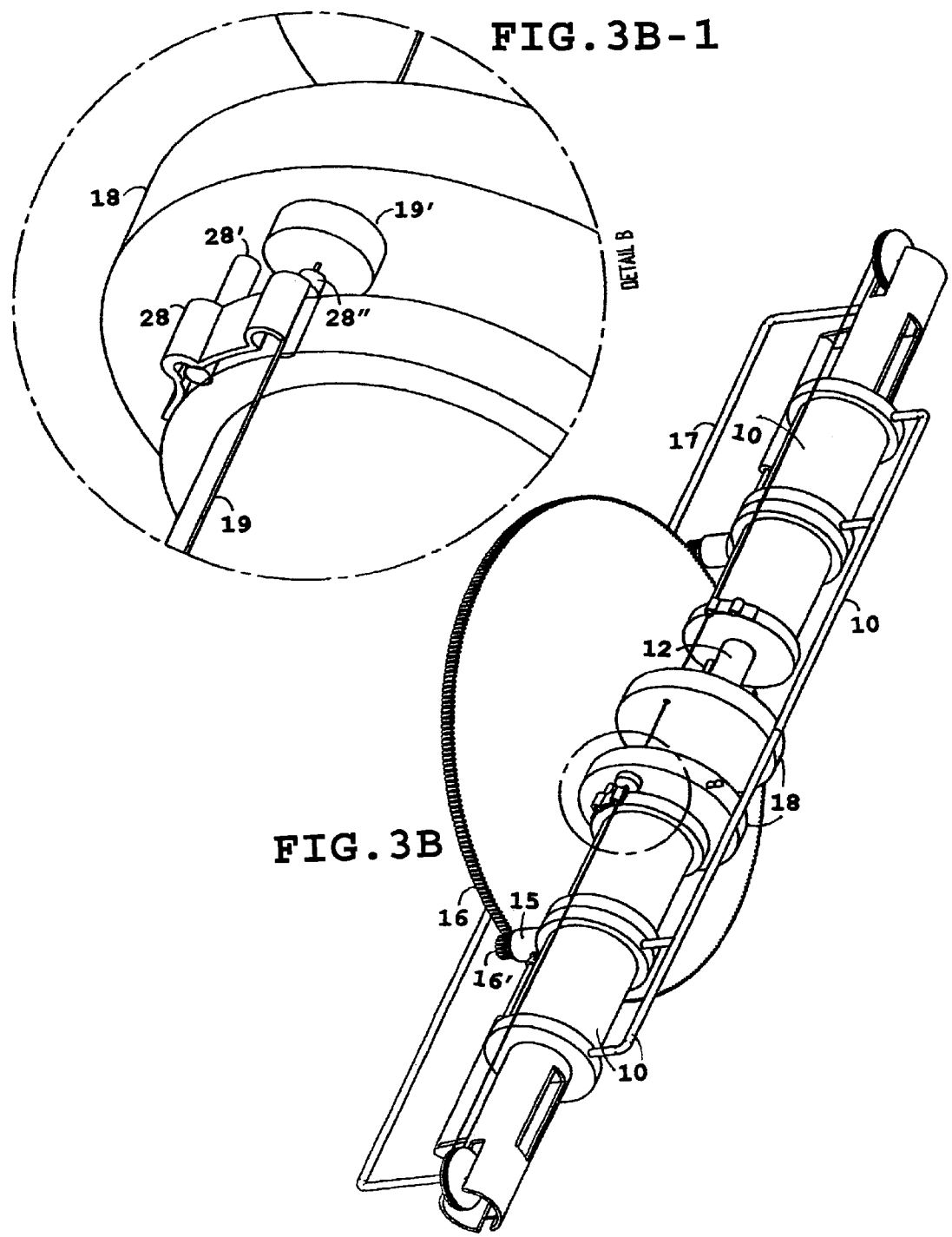

SYSTEM FOR OBTAINING ROTATIONAL ENERGY FROM AMBIENT FORCES

BACKGROUND OF THE INVENTION a) Field of the Invention

The present invention relates to machines, systems and methods where driving-thrusts can be originated by utilizing unidirectional force and ambient-fluid-pressure.

b) The Prior Art

A limited range of machines, systems and methods are known where driving-thrust can be originated by utilizing unidirectional force and ambient-fluid-pressure. However, none has combined system components with the physical principles as are described in this invention.

SUMMARY OF THE INVENTION

This invention could make it possible to build a system that would be able to generate electricity anywhere. In such systems, vacuum could be developed with less force than it naturally is required to create said vacuum. By combining two cylinders containing pistons and having fluid, under predetermined pressures, flows in and out the cylinders, vacuum could be created, which will be able to draw more mass than the mass that created said vacuum.

BRIEF DESCRIPTION OF THE DRAWINGS

The present invention will be more readily understood by reference to the following description, taken with the accompanying drawings, in which:

FIGS. 1A, 1A-1, 1B, 1B-1, 1C and 1C-1 illustrate in three stages how vacuum could be created with less weight than it naturally is required to create said vacuum.

FIGS. 3A, and 3B are perspective views of FIGS. 1A and 1B.

FIGS. 3A-1, and 3B-1 are Details of 3A and 3B, respectively.

DESCRIPTION OF ONE POSSIBLE EMBODIMENT

Figure 2:
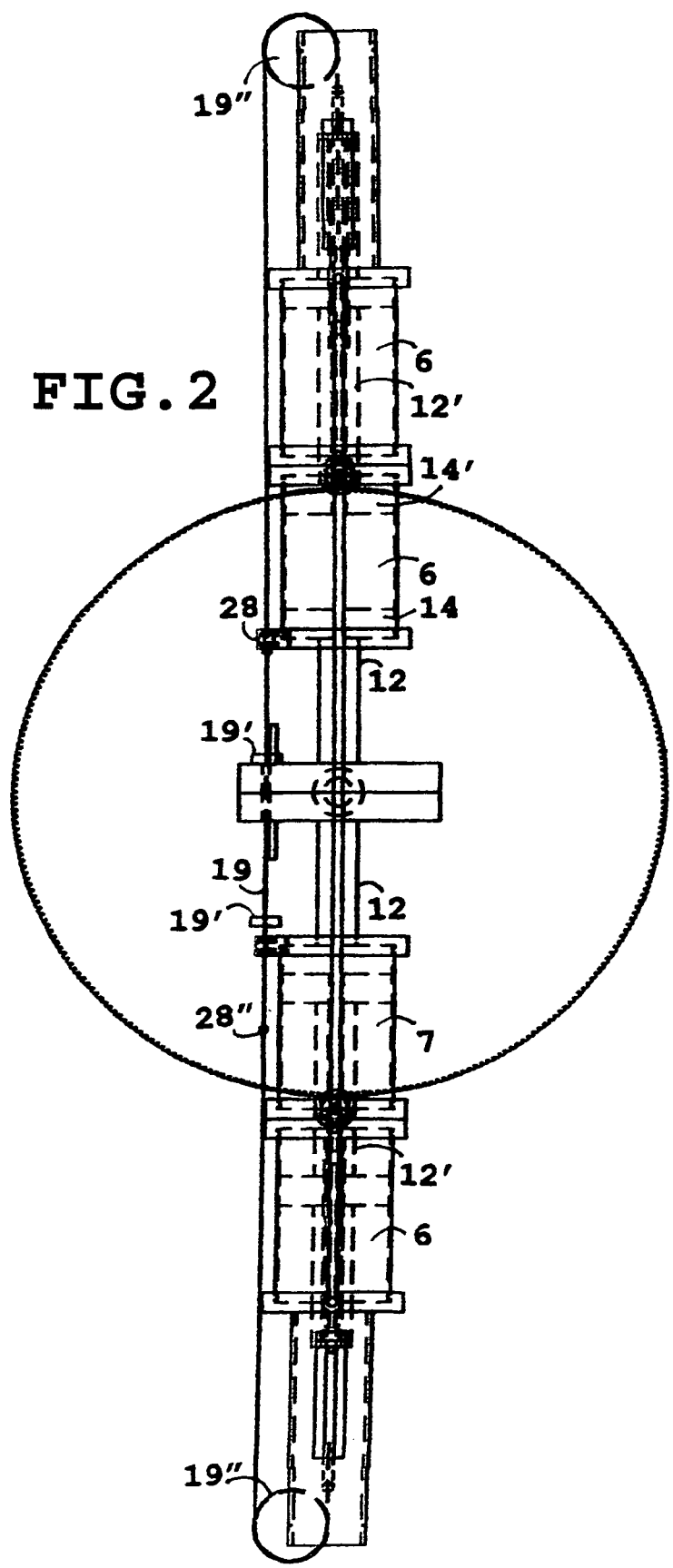
FIG. 2 shows the side view of FIG. 1C.

Parts in the embodiment and its designated numbers in the drawings are:

Gas 6; Ambient-fluid-pressure 7; Vacuum 8; Pipe 10; Shafts 12; Hollow-shafts 12'; Cylinders 13; Inward-pistons 14; Outward-pistons 14'; Pressure-reducers 15; Pressure-reducer-plugs 15'; Stationary-gear 16; Small-gears 16'; Frame 17; Weights 18; Cable 19; Cable-slugs 19'; pulleys 19''; Lockers 28; Release-pins 28'; Locker-slugs 28''.

The invention may be implemented in a wide range of embodiments.

FIGS. 1A, 1B and 1C illustrate the three stages in a process where vacuum 8 can lift heavier weight than the weight 18, which could create said vacuum 8. In FIG. 1A two cylinders 13 are shown lined in parallel to a vertical-line and are adapted to rotate about the center point of frame 17. Each cylinder 13 contains inward-piston 14 and outward-piston 14'. The inward-piston 14 in each cylinder 13 is connected to a shaft 12, which protrudes the hermetically sealed end of each cylinder 13, toward the axis of rotation, and a unit of weight 18 is connected to the other end of each shaft 12. As it is seen in FIG. 1A, the inward-piston 14 in the bottom cylinder 13 could be pushed down by the bottom weight 18, which is also adapted to pull the outward-piston 14' up, in the upper cylinder 13, by means of cable 19, cable-slug 19' and pulley 19'', shown in FIG. 2 and in FIG. 3A. The pressure of gas 6 between the inward-piston 14 and the outward-piston 14' in each cylinder 13 is set at less than the ambient-fluid-pressure 7. As cylinders 13 rotate around stationary-gear 16, small-gears 16' spin, which enable the respective pressure-reducer 15 to reduce the ambient-fluid-pressure 7 in its ascending cylinder 13, because the opening in said pressure-reducer 15 has been plugged with its plug 15', seen in FIG. 1A-1. Under such conditions, where the gas-pressure 6 is less than the ambient-fluid-pressure 7 and the ambient-fluid-pressure in the upper cylinder 13 has been reduced, the bottom weight 18 could descend by the pull of gravity and thus could do, both, push the inward-piston 14 down, in the bottom cylinder 13 and pull the outward-piston 14' up, in the upper cylinder 13. At the same time, gas 6 can flow from the bottom cylinder 13 to the upper cylinder 13 through the hollow shaft 12' of the bottom outward-piston 14', pipe 10 and the hollow shaft 12' of the upper outward-piston 14', shown in FIG. 1B and in FIG. 1B-1. As soon as the outward-piston 14' in the upper cylinder 13 reaches its highest point, locker-slug 28'' is caught in locker 28, which locks the upper outward-piston 14' in said highest point. At the same time, the inward-piston 14 in the bottom cylinder 13 lands on top of the outward-piston 14', with vacuum 8 created over it. At that moment, the bottom release-pin 28' triggers locker 28 and releases the respective locker-slug 28'', which frees the bottom outward-piston 14' to be lifted by the sucking force of vacuum 8 and the ambient-fluid-pressure 7 combination, seen in FIG. 3A-1 and FIG. 3B-1 (slack of cable 19 not shown). When both outward-pistons 14' and the bottom inward-piston 14 are at their highest points, in their respective cylinders 13, both weights 18 are at the same distance from the axis of rotation. In this position the opening in the upper pressure-reducer 15 has already been unplugged and the opening in the bottom pressure-reducer 15 is now being plugged by the respective pressure-reducer-plug 15', seen in FIG. 1C and in FIG. 1C-1. These positions of the pistons and the units of weight cause cylinders 13 to become unbalanced and, thus, force them to roll continuously in one direction. The efficiency of the respective pressure-reducer 15 in reducing the ambient-fluid-pressure 7 in the ascending cylinder 13 is one major factor, which determines the capacity of the system. A piston inside each cylindrical pressure-reducer 15, for example, could be driven back and forth by a double threaded shaft that spun by its small-gear 16', is one way to achieve such efficiency.

A number of identical frames and their components can be arranged in tandem within one cylindrical axle to form radial array and be adapted to let ambient fluid in and out the cylinders. The Cylindrical axle can be filled with lighter gas than the fluid surrounding the system and which could render the cylindrical axle buoyant and, thus, substantially reduce rotational friction. This system can rotate anywhere were there are two basic forces having influence on the system: one is a unidirectional force—such as the gravity pull or artificial gravity pull by centrifugal force found in rolling spaceship; the other is fluid pressure that surrounds the system—such as the atmospheric pressure, deep-sea pressure, or fluid pressure in a closed chamber.

While this invention has been described with reference to the mechanism disclosed herein, it is not confined to the details as set forth and is not intended in any way to limit the broad features or principles of the system, method and apparatus, or the scope of patent monopoly to be granted.

This application is intended to cover any modification or changes that may come within the scope of the following claims.

I claim:

1. A method, by which driving-thrust can be originated, including the steps:
   (a) Arranging in tandem a number of rotating frames that form radial array, each frame includes two units of weights at its mid-section and one cylinder at each end of the frame, each cylinder includes pistons, which are adapted to create vacuum in the bottom cylinder with units of weight, which are lighter than the units of weight said vacuum could lift;
   (b) Having gas between the pistons in each cylinder with less pressure than the atmospheric pressure, adapted to flow from the bottom cylinder to the upper cylinder;
   (c) Reducing the atmospheric pressure in the respective cylinder, as it rotates upwards;
   (d) Pushing the respective piston down in the bottom cylinder and pulling-up the respective piston in the upper cylinder with the respective unit of weight;
   (e) Locking the elevated piston in the upper cylinder;
   (f) Creating vacuum in the bottom cylinder and setting the locked piston in the bottom cylinder free to be elevated with the other piston in the bottom cylinder and with the lower unit of weight;
   (g) Lifting the two pistons in the bottom cylinder with the lower unit of weight, so as to unbalance the cylinders and force them to maintain their rotational driving thrust.

2. A system, for obtaining rotational energy from ambient forces, comprising:
   (a) Frames, within cylindrical axle, adapted to rotate about relatively fixed axis of rotation and lined-up in tandem to form radial arrangement;
   (b) Cylinders, at each side of the axis;
   (c) Pipes, each pipe adapted to let gas flow between the two cylinders of each frame;
   (d) Pistons, one inward-piston and one outward-piston in each cylinder;
   (e) Shafts, one shaft connected to one inward-piston in each cylinder and extended toward the axis of rotation;
   (f) Units of weight, one unit of weight connected to each shaft and adapted to push the inward-piston in the respective cylinder and to pull the outward-piston in the other cylinder;
   (g) Means for creating vacuum in the respective cylinder, adapted to draw more mass than the mass creating said vacuum;
   (h) Means for increasing the system driving thrust.

3. The system as in claim 2, wherein the means for creating vacuum in the respective cylinder, adapted to draw more mass than the mass creating said vacuum, comprising:
   (a) Gas, between the pistons in each cylinder, having less pressure than the ambient fluid pressure;
   (b) Means for reducing the ambient-fluid-pressure in the respective cylinder;
   (c) Means for pulling the outward-piston in said respective cylinder and locking it and for releasing the locked outward-piston in the cylinder with said vacuum.

4. The system as in claim 2, wherein the means for increasing the system driving thrust, comprising:
   (b) Means for placing the system in heavier Surrounding fluid;
   (b) Means for increasing the unidirectional force that acts on the system;
   (c) Means for reducing drag and rotational friction.

* * * * *